United States Patent [19]

Santuccio

[11] 4,166,693

[45] Sep. 4, 1979

[54] PHOTOGRAPHIC APPARATUS AND METHOD

[76] Inventor: Benjamin Santuccio, 729 Van Houten Ave., Clifton, N.J. 07013

[21] Appl. No.: 902,072

[22] Filed: May 2, 1978

[51] Int. Cl.$^2$ .................... G03B 27/52; G03B 27/62; G03B 27/32

[52] U.S. Cl. .................................. 355/61; 355/75; 355/77

[58] Field of Search ................. 355/18, 61–65, 355/72, 74, 75, 77, 32, 35, 37, 38, 67–71

[56] References Cited

U.S. PATENT DOCUMENTS

| | | | |
|---|---|---|---|
| 2,378,933 | 6/1945 | Klemm et al. | 355/61 |
| 2,816,475 | 12/1957 | Waller et al. | 355/69 X |
| 3,040,644 | 6/1962 | Hearther | 355/61 X |
| 3,765,761 | 10/1973 | Leonhart et al. | 355/62 |
| 4,093,379 | 6/1978 | Weiner | 355/77 |

FOREIGN PATENT DOCUMENTS

| | | | |
|---|---|---|---|
| 571804 | 3/1959 | Canada | 355/35 |
| 41704 | 10/1965 | Fed. Rep. of Germany | 355/75 |

*Primary Examiner*—Donald A. Griffin

[57] ABSTRACT

A camera having a copyboard for support of copy material pivotally mounted before the lens for viewing through the ground glass back for adjustment of focus and positioning of the copy material, has the copyboard pivotally mounted for return to a horizontal position in which the copy is generally supplied, and for improvement herein, the copyboard in vertical position is first centered and focused before the camera without copy material, and has a means for projecting an image of a guiding template upon the surface of the copyboard in horizontal position to project lines thereon serving as a guide for positioning of the copy material, whereby the copyboard and adjusted copy therein according to the projected guide lines, is already in focus when pivotally returned to vertical photographing position, so that the copyboard and supported copy therein needs merely to be photographed without further adjustment of position, with very substantial saving of photographic work of the operator to achieve and positioning of the copy material. In another aspect the template may have radial lines angularly disposed through the center, each projected at a copy guide angle upon the surface of the copyboard, provide a guide for rotation of the copy material according to the angular position needed for photographing to reproduce the copy in color, each guide angle corresponding to the necessary angular set of the copy material needed for a particular color. The copyboard with the radial guide lines projected on its surface portion, provide a guide for positioning of the copy material at the selected color angle for each color, so that the copyboard with the angularly set copy therein is then positioned by pivotal movement to vertical position before the camera to photograph the copy directly through a half-tone screen for the selected angular color, without need for further positioning or focusing of the copy or copyboard through the ground glass. The copy material is then photographed in a series, for each color, returning to the horizontal position for rotation again to the next color angle provided by the projected guide lines, and again returned on its pivot to photographic position before the camera, thus photographing, the copy in the series of angular positions for each color, without need for adjustment of or other positioning focus throughout the series, following the first presetting of the camera in focus.

9 Claims, 5 Drawing Figures

U.S. Patent
Sep. 4, 1979
4,166,693
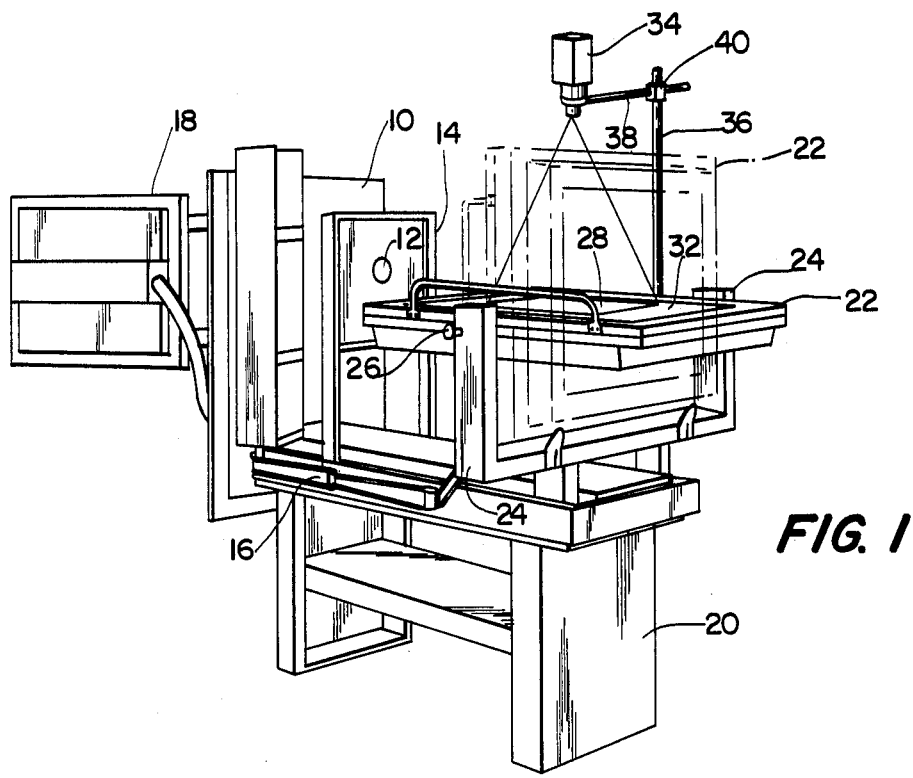
FIG. 1
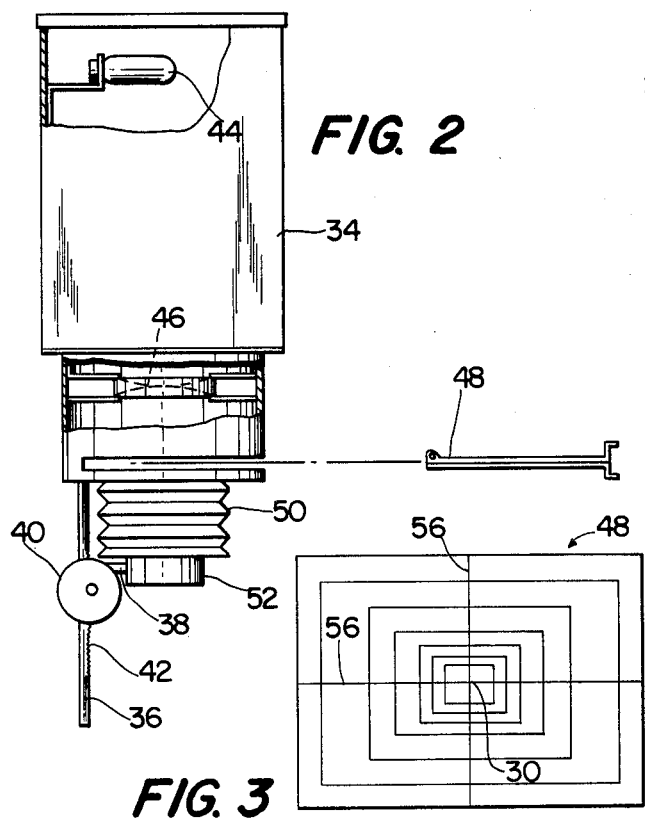
FIG. 2
FIG. 3
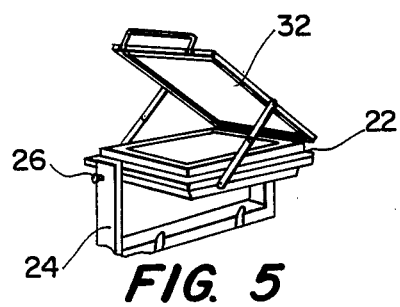
FIG. 5
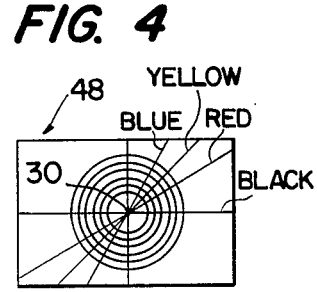
FIG. 4

PHOTOGRAPHIC APPARATUS AND METHOD

This invention relates to a method and photographic apparatus for orienting and photographing copy, such as art work or other copy material which is to be photographically reproduced, and particularly, to orientation of the copy material with respect to guide lines projected upon a copyboard by an auxilliary projecting device against which the copy material is oriented in position for photographing, whereby a single orientation of the copy in focus suffices to make one or any number of photographic copies of the material without need for step-wise checking of the copyboard and copy material thereon, and the focus of the camera.

BACKGROUND OF THE INVENTION

For usual photographing of flat art work, herein referred to as copy, such as a picture, print or drawing or other similar copy material to be photographically copied, the copy is supported upon a copyboard mounted in a vertical or other selected plane before a camera, the back of the camera supporting the film and a ground glass is first opened for viewing and focusing of the camera lens with respect to the vertical copyboard supported copy, orienting the copy and camera by movement respectively, for focusing, rotating the copy as well as centering to achieve correct placement of the copy with respect to the camera lens and focus thereof. It requires first centering of the copy on the copyboard and in the lens, each viewing through the camera including extinction of lights followed by adjustment of the copy position with great loss of time by the photographer. Particularly, there is great loss of time by using a copyboard pivotally mounted for movement from horizontal position in attaching the copy thereon to a vertical position for support of the copy on the copyboard. Usually a graphic arts camera is used, which comprises a ground glass structure defining a film plane. The camera and copyboard are relatively movable usually in a horizontal plane for achieving focus, and the copyboard may be raised to vertical position for photographic copying or lowered to horizontal position for achieving best adjusted copy orientation thereon.

SUMMARY OF THE INVENTION

According to the present invention the camera is combined with a pivotally supported copyboard, pivotal from horizontal to vertical positions before the camera with the copy material mounted upon the copyboard in oriented position for photographic copying, and is further combined with an auxilliary image projecting means for projecting copy orienting lines through a template, as a light image thereof upon the copyboard in horizontal position.

The projected image serves as a guide for placing the copy upon the copyboard for orienting both for centering and rotating to a selected angle desired, particularly for color reproduction. More particularly, the invention includes orienting and centering the copyboard with respect to the lens of the camera and the film supported and positioned for immediate photographic copying thereon, and the copy is so oriented according to the projected guide lines of the orienting image supplied by the template, allowing immediate positioning of the copy for photographing as a fully focused direct or enlarged copy, without need for further adjustment of the camera, so that after orienting the copy in the projected guide lines and merely by raising the mounted copy to the vertical copyboard position for immediate photographing, great time saving is achieved by the operator.

Where the photograph is to be taken in color, the camera has inserted, as conventional, a half tone screen, and a template image of radial lines are projected through the center point of the focused copyboard, and the copy is angularly supported as guided alternately by these radial lines, each according to a color. The several lines correspond to the angular lines mounted of the copy as needed for individual colors, and the copy is mounted in a photographic sequence angularly for each radial line, whereby exposure with alternate movements of the copy in angular displacement for each colored line taken in a series of exposures through the half tone screen, results in a photograph of several selected colors, without need each time for examining angular position and focus in vertical copy position before photographing. Again, a great time saving technique is achieved for color photographing.

DESCRIPTION OF THE PREFERRED EMBODIMENTS

The invention is further described with reference to the drawings, wherein:

FIG. 1 shows the assembled apparatus in perspective;

FIG. 2 is an elevational view of the auxilliary projector;

FIG. 3 is a template having rectangular orienting lines for projection as an image upon the copyboard through the projector of FIG. 2;

FIG. 4 is an alternate type of template for projecting radial lines as an image upon the copyboard for guiding the rotation of the copy material for color reproduction; and FIG. 5 is a detail of the copyboard.

Referring to FIG. 1, a graphic art type camera 10 has a lens 12 at its forward end, mounted upon a horizontal supporting bed 14 on which the camera is horizontally slideable and supported in a bed 16 for adjustment of the focus or enlargement by positioning of the lens 12. The camera conventionally carries the ground glass and rear cover portion 18 for viewing of the focus and position of the copy by the operator through the lens 12 and enclosing and supporting the film, (not shown), as a conventional graphic arts camera supported for horizontal copy work of flat sheet material mounted upon a horizontal stand 20.

The camera 10 thus supported on the horizontal bed 16 is in turn supported by the stand 20 as a conventional graphic arts camera. The copyboard 22 is pivotally supported between a pair of yoke arms 24 by pivots 26 for rotation between the vertical photographing and horizontal copy adjustment positions. Thus, as shown in the dotted line position of FIG. 1 the copyboard can be moved to a vertical photographic position, in which the lens 12 of the camera will be adjusted to focus upon the supported copy 28 by adjustment of the position of the camera and film therein, as viewed through the ground glass and door 18 for conventional accurate focus and photographing of the vertically supported copy upon the film therein.

In past conventional use of such camera and copyboard, the copy is adjusted upon the copyboard as shown in FIG. 5 as well as the operator is able, and the copyboard with the copy thereon is then turned pivotally to vertical position where the operator will view the position through the ground glass and open the back 18 position for determining the position of the copy and focus thereof. The operator then will close the back 18 and will return the copy support to horizontal position making further adjustment of the copy position needed, and will then return the assembly to the vertical position and view the positioning of the copy again from the open back of the camera, to see whether the copy has been properly placed thereon for photography. That much as described to this point is conventional handling by the photographer who will view the copy upon the vertical copyboard support and return the copyboard to horizontal position for adjustment of the copy position in trial and error manner until he is finally able to achieve a properly oriented and focused position and set the copy in proper position for photography. Such process is very time consuming.

According to the present invention the camera and copyboard are positioned in a vertical plane below the lens, according to the dotted line position in FIG. 1, and focused one to the other in the first instance, whereby the center point of the camera is clearly focused upon a center point 30 of the copyboard without the copy material. The copyboard is then returned to the full line horizontal position for mounting of the copy material thereon. The copy material is held as shown in FIG. 5 by any suitable means such as a clear transparent glass surface 32 secured as by hinging in a frame to the upper surface of the copyboard 22, held thereto by a suitable fit or clamps, as is conventional.

A device herein termed a projector 34 is supported by a vertical arm 36 on which is fastened a horizontal arm 38 in a selected position by adjustment clamp 40. The support 36 may have rack type teeth 42 thereon which cooperate with a spur gear (not shown) fastened to a support shaft cooperatively rotated by knob 40, whereby the projector 34 is raised and lowered upon the shaft 36 by manual rotation of the knob 40 to secure adequate positioning and focus of the projector 34 above the copyboard surface 32. The projector 34 has a projecting light source, such as a high intensity lamp 44 mounted in its upper end which projects light rays through a concentrating lens 46 and thence through a template support 47 in which is positioned and supported a template 48 of the character shown in FIG. 3 or FIG. 4.

A bellows 50 and lens 52, are supported positionably at the lower end of the projector 34, whereby light rays from the source 44 are projected first through the template 48 and downward upon the surface 32 of the copyboard 22, focusing the image of the template 48 either of FIG. 3 or FIG. 4 on the copyboard surface 32.

The position of the copy material then is adjusted, according to the center lines 30 and centered within one of the rectangles outlining the copy for size and angularity, that is, within the lines 54 and 56 thereon, whereby the projected rectangular lines 54 and 56 together with the center point 30 serve as a projected light image of the template 48 to guide the positioning of the copy material beneath the support surface of the copyboard 32, thus guiding the positioning of the copy upon the copyboard. Since the copyboard had already been oriented and focused to centerpoint and to focusing distance of the copyboard with respect to the camera lens in the original position, (dotted line position of FIG. 1), and since the copy material has already been oriented with respect to the template for positioning for angularity on the copyboard, the copyboard needs merely then to be pivotally returned to its vertical position (dotted line position of FIG. 1), for photographic copying, i.e. exposure of the copy material so oriented of the copyboard by operation of the camera and exposure of the film, photographing directly the copyboard and material thereon without further adjustment.

In that manner the copy material can be photographed from the positioning of the copy material achieved with the aid of the projector and template lines projected on the copyboard surface without need for further adjustment of the camera with respect to the copy material thereon. Thus the camera and copyboard only needs initial adjustment for center line and focus without the copy material therein, and the copy material independently is mounted adjusted in position on the copyboard to the image cast upon its surface by the template design, whereby no further adjustment of the camera or copy material position is needed for photographing with the camera from the simple raising to vertical position of the copyboard and copy material thereon.

There is consequently a considerable saving of time of the operator, who needs only to project the image of the template upon the horizontal position surface of the copyboard and adjust the position of the copy material in that horizontal copyboard position. The copy needs merely to be placed on the copyboard adjusted as to center point and angular orientation as guided by the template image on its surface. There is great saving in time of the operator, since there is not further necessity to open the back of the camera and examine the position of the vertically supported copy material of the camera through the ground glass before final photocopying. There is no further need to examine the copy material orientation through the camera lens for centering or angularity and no need to make any further camera adjustment. Thus, by the present method, once having established the center point of the copyboard with respect to the lens, the operator is then able merely to horizontally supply copy material adjusted to the template image and center and then to raise the copyboard and copy material positioned thereon to vertical position, and raise each so-mounted pieces of copy material and photographs without need for further adjustment of the camera or its focus, merely changing the setting of the film for each copy of material photographed.

This procedure and operation greatly increases the ease and rate the photography of copy material, reducing much of the extra labor for achieving adjustment of the camera for each piece of copy material that normally would have been applied by the operator, according to past practice.

In an alternate procedure, and using the substantially different radially marked template 48 in the projector 34, as shown in FIG. 4, the approximate corresponding time saving procedure becomes available for color photography. For past color photography practices it normally was necessary first to mount a half-tone screen in the camera, and after first photographing the copy material in normal rectangular position as described above, the copy material then needed to be rotated abouts its center point without a guide for positioning angularly by first being merely viewed and rotated angularly for color angle as well as for centering and focus with each movement of the copy material, both in the horizontal position for placement and vertical position for checking before photographing. Thus each color required a series of angular positionings.

According to the present invention, the template 48 shown in FIG. 4 has the properly adjusted angular lines projected as an image of that template upon the copyboard surface 32, while lying in horizontal position as shown in FIG. 1, which allows the copy material supported beneath the surface 32, as shown in FIG. 5 to be accurately positioned in sequence for several colors.

As an example the copyboard in vertical dotted line position of FIG. 1 is first oriented by viewing the center and focus of the vertical position of the copyboard through the open ground glass protective back of the camera, both for centering and focus. It will also be adjusted for enlargement or reduction in size as desired. A half tone screen for color photography is mounted in the camera before the film, whereby the positioning of the copyboard and focus through the half tone screen is completed. The copyboard then is pivotally changed to the horizontal full line position of FIG. 1, and the radial line image of the template shown in FIG. 4, mounted in the projecting device after focusing is projected on the copyboard surface 32. The copy material is mounted beneath the surface, as shown in FIG. 5, and the copy material is then angularly disposed at an angle of 75°, aligned according to the first radial guide line for red color photography. The copyboard with the angularly mounted copy material at 75° is returned to the vertical position and photographed through the half tone screen without need for further adjustment of the copyboard position. It is then returned to horizontal for the yellow second color, the copy material being rotated for that color to an angle of 90°, aligned according to the projected radial line therefore shown in FIG. 4, and the copyboard with the copy at that angle is returned to the vertical position and then exposed photographically through the half tone screen for imparting the second yellow color, again without need for adjustment of the focus in the camera. It is then returned to the horizontal position a third time, the copy then being rotated to the projected angle of 105° for blue, using the projected radial guide line for adjustment of the copy position as before. The blue angle copy position and the copyboard is then returned to vertical and photographed a third time for supplying the blue color. In this manner all three colors are supplied to print with a single preliminary setting of the focus, and following that first step the series of color exposures can be made using the projected guide lines of the template for angular positioning of the copy material in a series of steps, but without need for further adjustment of focus or further viewing through the ground glass as the series of photographic exposures for color are made.

The procedure of this example can of course be modified by a fourth exposure for black and white, using lines 56 angle for orienting the copy material.

In this manner each of the radial line projected positions of the template 48 serve as a guide for setting the copy for rapidly photographing in each position in a series, whereby the total take of three or four exposures in the copy material, in alternately pivoted copyboard position is easily performed. There is great saving in time of the operator for achieving the black and white as well as the colored photograph in several colors by omitting the need for refocusing and resetting and checking of the angular position of the copy material by the operator in each angular position with viewing through the ground glass as was formerly necessary.

The usual modifications known in the photographic art will be applied here. Thus if the copy material is to be photographically enlarged or reduced the copyboard will be set according to known chart data for positioning, but will still be prefocused and centered as described above. Again various light filters will be used for color tone of each of the color exposures.

While the camera is conventionally mounted for horizontal viewing and exposure, it can be at any selected angle following the principle described with corresponding time saving by the operator.

I claim:

1. A photocopy device including, in combination, a camera and
a pivotally mounted copyboard for rotation from an adjustably focused photocopying position of said copyboard before the camera to about a 90° angle therefrom in copy mounting position of said copyboard, whereby to center and focus said copyboard before the camera in camera focused photographic copying position and then to mount and adjust the copy in said angularly disposed copy adjusting position supported by said copyboard for photocopying,
a light projecting means disposed above said copyboard in copy adjusting position for supporting and projecting light upon said copyboard through
a template mounted therein,
said template having linear markings on a transparent surface for projection of an image of said markings therethrough by said light as guide lines upon said copyboard for copy positioning thereon, according to said light projected linear markings,
whereby, the copy in said copyboard, pivotally raised to photographic position is in focus and position for photographic copying without further need for adjustment of the camera, copy material or copyboard.

2. A photographic device as defined in claim 1, wherein the linear markings on said template are rectangularly disposed about a centerpoint and said projecting device includes means for supporting the same adjustably above said copyboard in focused and sized position for projecting said linear markings thereon, in a size and position adjusted to accommodate the linear projection of said rectangular markings upon said copyboard to fit copy material as a rectangular guiding frame upon said copyboard.

3. The photographic device as defined in claim 2, wherein said rectangular markings define a series of rectangles sized to adjustably accommodate standard copy material sizes as a guiding frame.

4. The photographic device as defined in claim 1, wherein the markings on said template include radial lines drawn through a centerpoint, each angularly disposed to the others, and corresponding in angular position to a radial line when projected on said copyboard, serving as a guide line for angular mounting of the copy for a selected color.

5. The photographic device as defined in claim 4, wherein there are several angular markings corresponding in angular positions approximately to red, yellow and blue, as angularly disposed guide lines for color photography.

6. The photographic device as defined in claim 5, wherein several radial markings pass through a centerpoint and further include vertical and horizontal lines passing therethrough and from which the remaining lines are angularly disposed for defining the black and white alignment position of said copy.

7. Process for photocopying copy material mounted on a copyboard pivotally disposed before a camera for pivotal movement from horizontal copy material adjustment position to vertical photocopy position, comprising
- first centering and focusing the position of the copyboard through the camera lens for accurate photographic copying in centered and focused position,
- inserting the copy material in the copyboard,
- projecting on the surface of the copyboard from a marked template a light image of linear guide for lines positioning of said copy material in horizontal position of said copyboard,
- adjusting the copy material on said copyboard, both as to centering and to angularly thereon aligned with said projected linear image,
- rotating the copyboard and positioned copy material thereon to vertical photocopy position, according to said pre-focused and centering thereof with the camera and
- photocopying said oriented copy in the copyboard by said camera.

8. The process of photocopying copy material in color from positions of said copy material mounted in a copyboard pivotally supported between vertical photocopying and horizontal copy mounting positions, comprising
- first centering and focusing the position of the copyboard through the camera lens and screen for accurate photographic copying in centered and focused position before said camera,
- projecting a light image of radial guide lines comprising angularly disposed radial lines passing through a center point of said image as a guide for orienting said copy material in said copyboard, said lines corresponding in radial degrees, each to an optimum angular position for photocopying said copy material in a basic color, such as red, yellow and blue,
- first adjusting the copy material to an angularly projected guide line corresponding to the first desired color to be photographed with the copy disposed angularly as guided by the radial angle of the color selected to be photographed, moving the copyboard and angularly position copy material therein to said vertical position in the predetermined focus, and photographing said copy material through a half-tone screen to record on film the color usual for that angularity,
- returning the copyboard to the horizontal position and rotating the copy further to a second angularly guided color position and returning the copyboard and second positioned copy material therein to said vertical copy position and photographing the copy again on the film through the half-tone screen in the predetermined focus for photographing the second color, and
- then returning the copyboard to the horizontal position and rotating the copy material again to a third angularly guided color position established by said projected radial lines, and again rotating the copyboard to the vertical position of the same predetermined focus, and finally photographing the copy again on said film through the half-tone screen to form a composite photograph of the several colors.

9. The photocopying process as defined in claim 8, further including the step of photocopying said copy material in black and white color, said prefocused copy material being positioned in said horizontal position of said copyboard with respect to projected horizontal and vertical guide lines thereon, and photocopied in the vertical position of said copyboard and copy material position thereon.

* * * * *